US009569972B2

(12) United States Patent
Pasko et al.

(10) Patent No.: US 9,569,972 B2
(45) Date of Patent: Feb. 14, 2017

(54) UNMANNED AERIAL VEHICLE IDENTITY AND CAPABILITY VERIFICATION

(71) Applicant: Verizon Patent and Licensing Inc., Arlington, VA (US)

(72) Inventors: Douglas M. Pasko, Bridgewater, NJ (US); Ashok N. Srivastava, Mountain View, CA (US); Hani Batla, Teaneck, NJ (US); Igor Kantor, Raleigh, NC (US); Gurpreet Ubhi, Nutley, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 590 days.

(21) Appl. No.: 14/282,153

(22) Filed: May 20, 2014

(65) Prior Publication Data
US 2016/0125740 A1    May 5, 2016

(51) Int. Cl.
*G08G 5/00* (2006.01)
*B64C 39/02* (2006.01)

(52) U.S. Cl.
CPC ........... *G08G 5/0034* (2013.01); *B64C 39/024* (2013.01); *G08G 5/0039* (2013.01); *G08G 5/0069* (2013.01); *G08G 5/0078* (2013.01); *G08G 5/0082* (2013.01); *G08G 5/0086* (2013.01)

(58) Field of Classification Search
CPC ............................. G08G 5/0034; B64C 39/024
USPC ......................................................... 701/528
See application file for complete search history.

(56) References Cited

U.S. PATENT DOCUMENTS

| 8,644,512 B2* | 2/2014 | Khazan | G05D 1/0022 380/258 |
| 9,354,296 B2* | 5/2016 | Ubhi | G01S 5/0027 |
| 2005/0006525 A1* | 1/2005 | Byers | B64C 1/061 244/118.1 |
| 2009/0118875 A1* | 5/2009 | Stroud | G01S 5/0027 701/3 |
| 2015/0336667 A1* | 11/2015 | Srivastava | B64C 39/024 701/2 |

(Continued)

OTHER PUBLICATIONS

Redding et al., "Distributed Multi-Agent Persistent Surveillance and Tracking with Health Management", American Institute Aeronautics and Astronautics, AIAA Guidance, Navigation, and Control Conference, 2011, 18 pages.

(Continued)

*Primary Examiner* — Behrang Badii
*Assistant Examiner* — Michael Berns

(57) ABSTRACT

A device receives a request for a flight path for a UAV from a first location to a second location, credentials for the UAV, and component information for the UAV. The device determines, based on the credentials, whether the UAV is authenticated for utilizing the device and a network, and determines whether the UAV is capable of flight based on the component information and maintenance information. The device calculates, the flight path based on capability information for the UAV and/or other information, and determines whether the UAV is capable of traversing the flight path based on the capability information and/or the other information. The device generates flight path instructions for the flight path, and provides the flight path instructions to the UAV to permit the UAV to travel from the first location to the second location via the flight path.

20 Claims, 13 Drawing Sheets

(56) References Cited

U.S. PATENT DOCUMENTS

| | | | | |
|---|---|---|---|---|
| 2016/0111006 A1* | 4/2016 | Srivastava | ............... | G05D 1/00 701/3 |
| 2016/0125740 A1* | 5/2016 | Pasko | .................. | G08G 5/0034 701/528 |

OTHER PUBLICATIONS

Richards et al., "Model Predictive Control of Vehicle Maneuvers with Guaranteed Completion Time and Robust Feasibility", American Control Conference, 2003, Proceedings of the 2003, vol. 5, IEEE, 2003, 7 pages.

Park et al., "Agent Technology for Coordinating UAV Target Tracking", Knowledge-Based Intelligent Information and Engineering Systems, Springer Berlin Heidelberg, 2005, 8 pages.

Kuwata et al., "Three Dimensional Receding Horizon Control for UAVs", AIAA Guidance, Navigation, and Control Conference and Exhibit, Aug. 16-19, 2004, 14 pages.

Alighanbari et al., "Filter-Embedded UAV Task Assignment Algorithms for Dynamic Environments", AIAA Guidance, Navigation, and Control Conference and Exhibit, Aug. 16-19, 2004, 15 pages.

Saad et al., "Vehicle Swarm Rapid Prototyping Testbed", American Institute of Aeronautics and Astronautics, Aerospace Conference and AIAA Unmanned . . . Unlimited Conference, 2009, 9 pages.

Richards et al., "Decentralized Model Predictive Control of Cooperating UAVs", $43^{rd}$ IEEE Conference on Decision and Control, vol. 4, IEEE, 2004, 6 pages.

Bertuccelli et al., "Robust Planning for Coupled Cooperative UAV Missions", $43^{rd}$ IEEE Conference on Decision and Control, vol. 3, IEEE, 2004, 8 pages.

Toksoz et al., "Automated Battery Swap and Recharge to Enable Persistent UAV Missions", AIAA Infotech@ Aerospace Conference, 2011, 10 pages.

How et al., "Multi-vehicle Experimental Platform for Distributed Coordination and Control", http://web.mit.edu/people/ihow/durip1.html, Apr. 1, 2004, 4 pages.

Chung Tin, "Robust Multi-UAV Planning in Dynamic and Uncertain Environments", Massachusetts Institute of Technology, 2004, 110 pages.

How et al., "Flight Demonstrations of Cooperative Control for UAV Teams", AIAA $3^{rd}$ "Unmanned Unlimited" Technical Conference, Workshop and Exhibit, Sep. 20-23, 2004, 9 pages.

Wikipedia, "Waze", http://en.wikipedia.org/wiki/Waze, Mar. 30, 2014, 6 pages.

Choi et al., "Information deliver scheme of micro UAVs having limited communication range during tracking the moving target" The Journal of Supercomputing, vol. 66, Issue 2, 2013, pp. 950-972.

Boyd et al., "Convex Optimization", Cambridge University Press, 2004, 730 pages.

\* cited by examiner

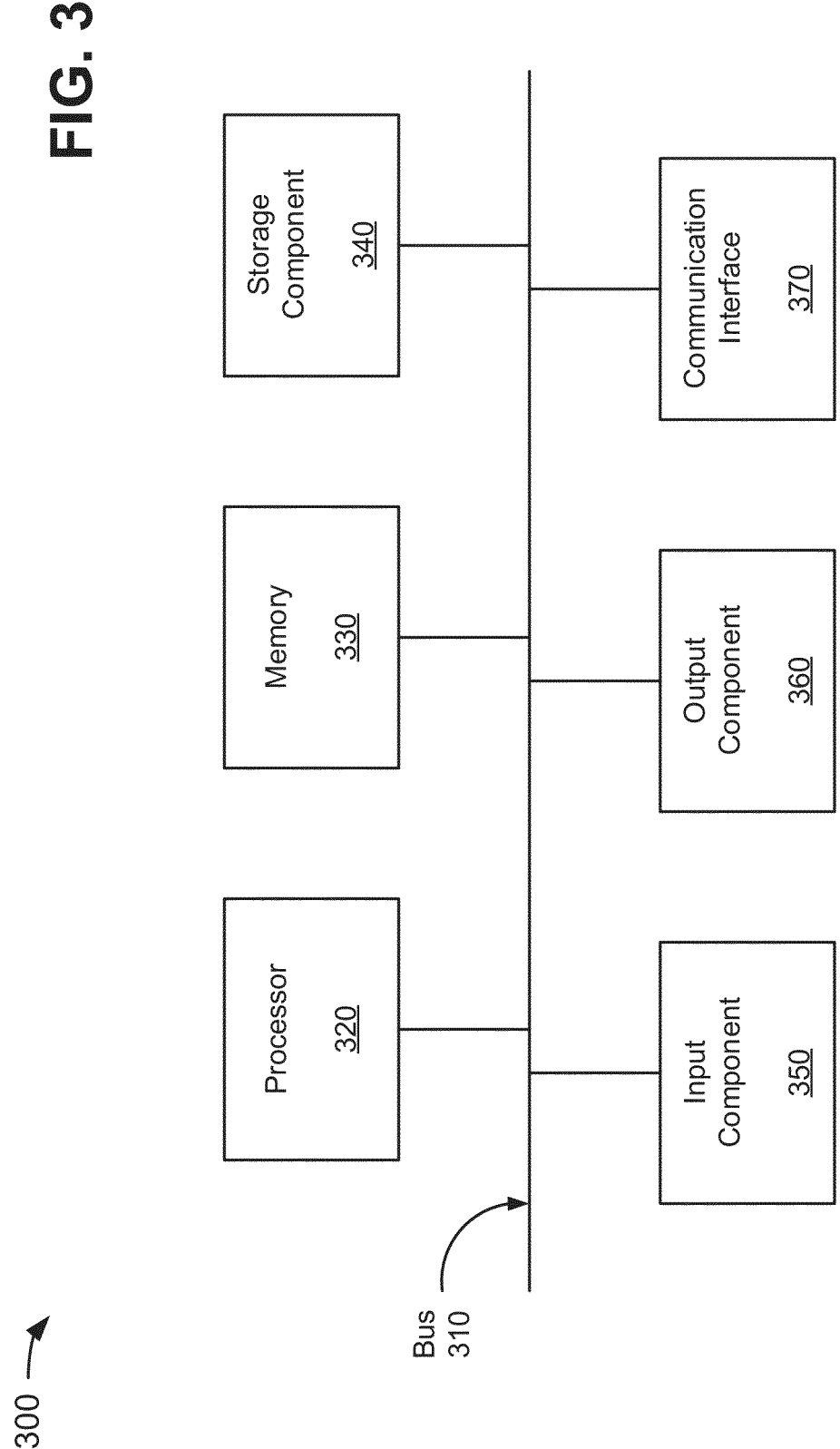

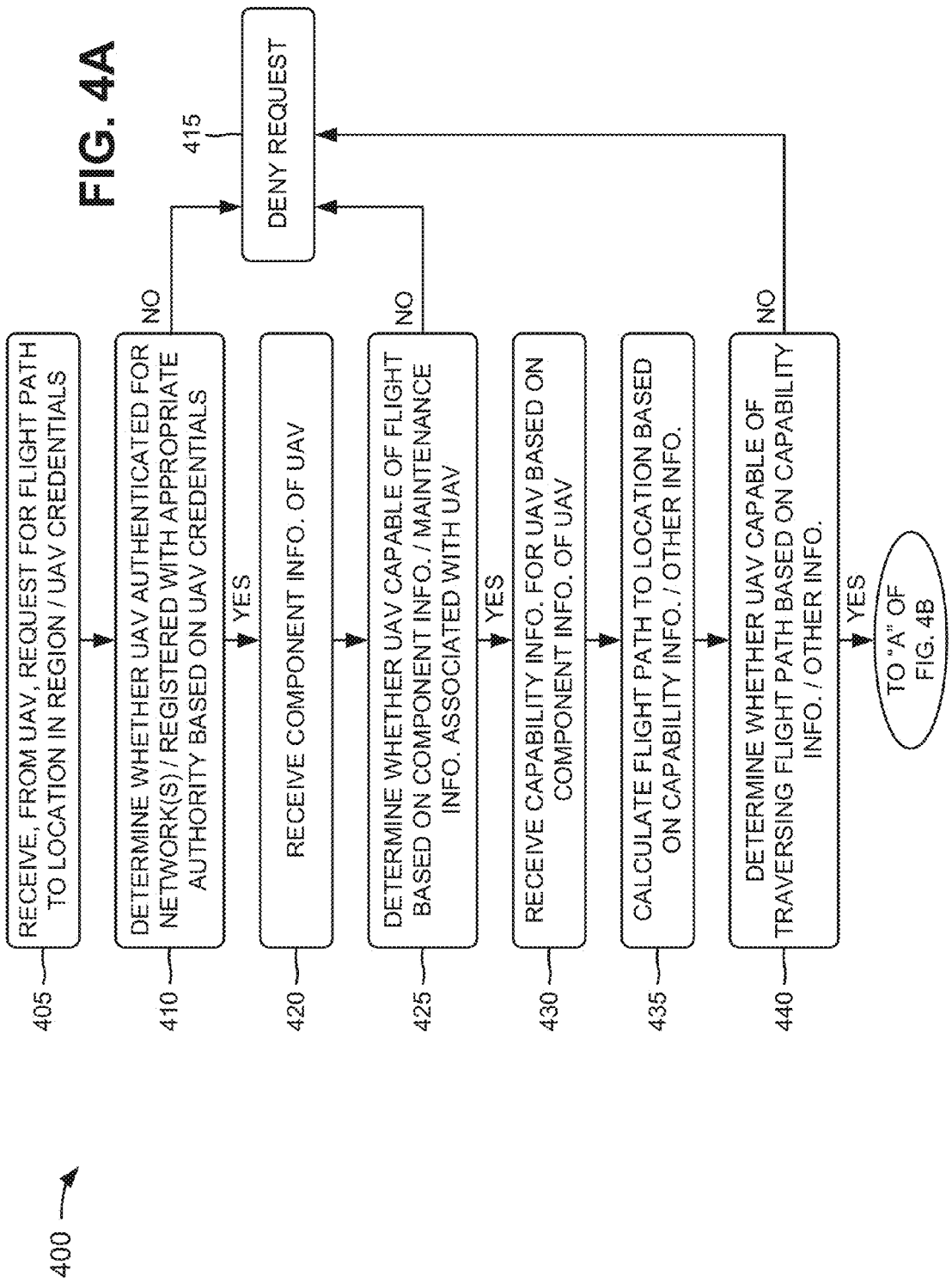

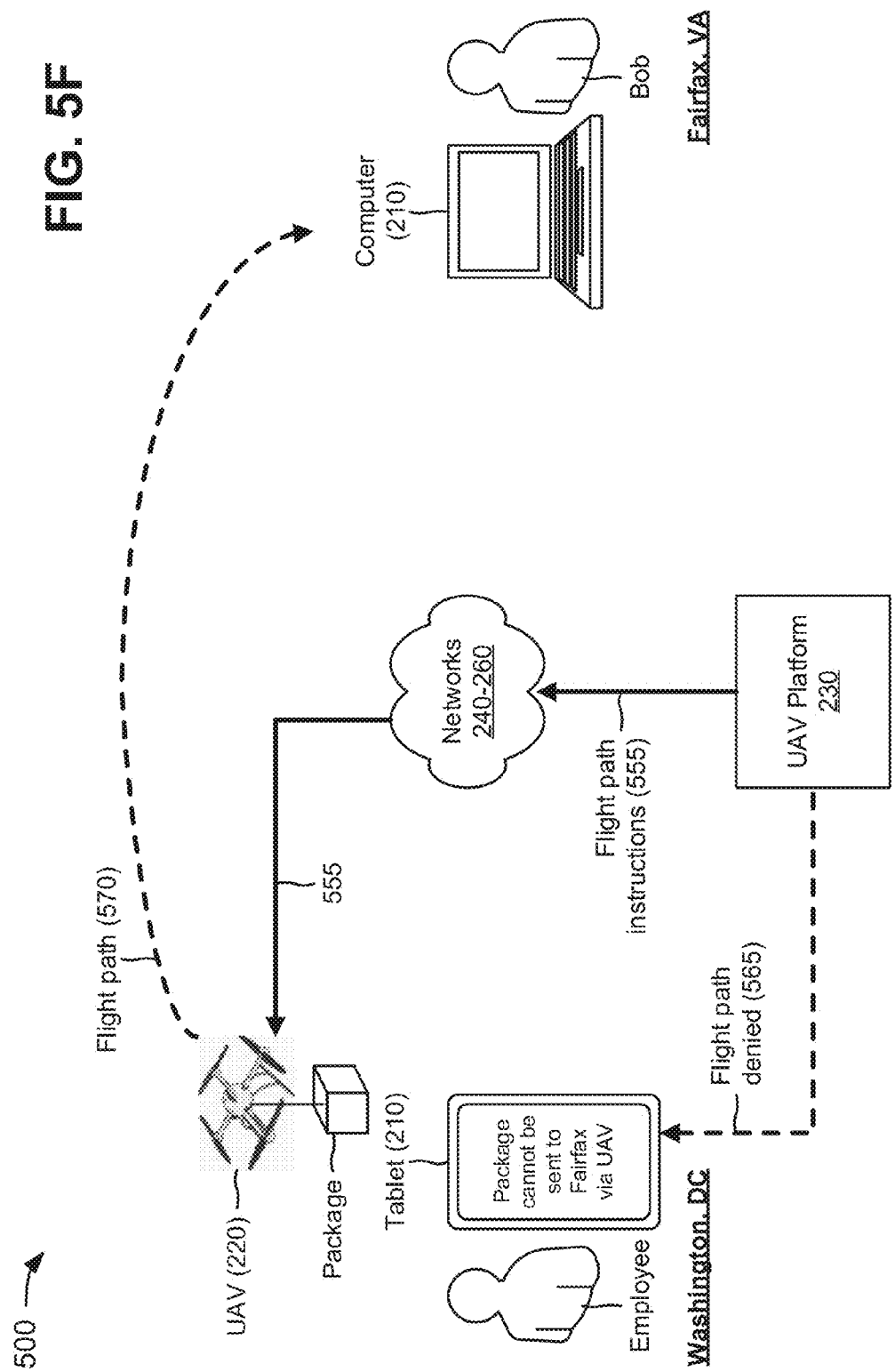

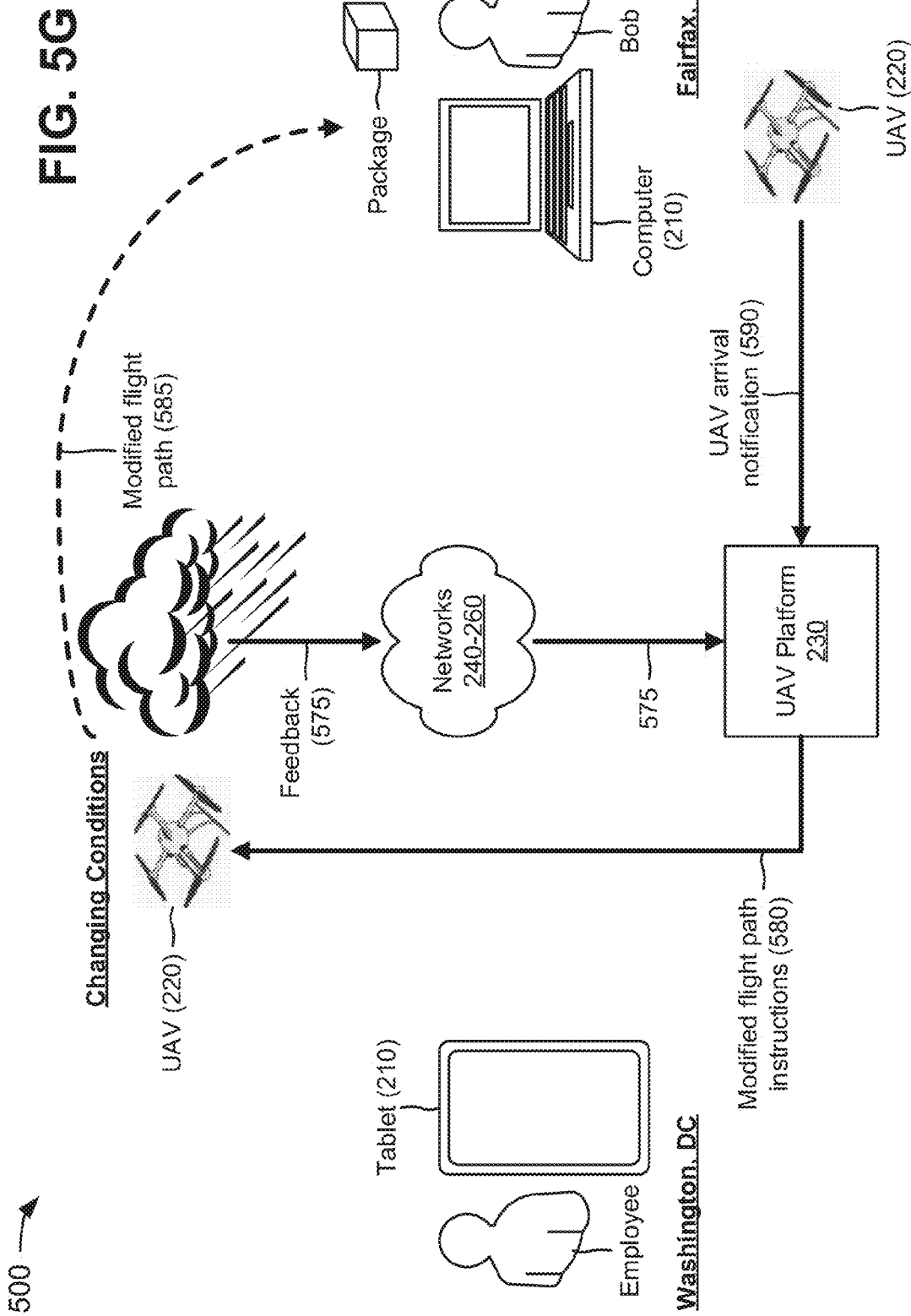

UNMANNED AERIAL VEHICLE IDENTITY AND CAPABILITY VERIFICATION

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of civilian applications, such as police surveillance, firefighting, security work (e.g., surveillance of pipelines), surveillance of farms, commercial purposes, etc.

BRIEF DESCRIPTION OF THE DRAWINGS

FIG. 3 is a diagram of example components of one or more devices of FIG. 2;

FIGS. 4A and 4B depict a flow chart of an example process for verifying an identity and capabilities of a UAV and for determining a flight path for the UAV; and FIGS. 5A-5G are diagrams of an example relating to the example process shown in FIGS. 4A and 4B.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1A:
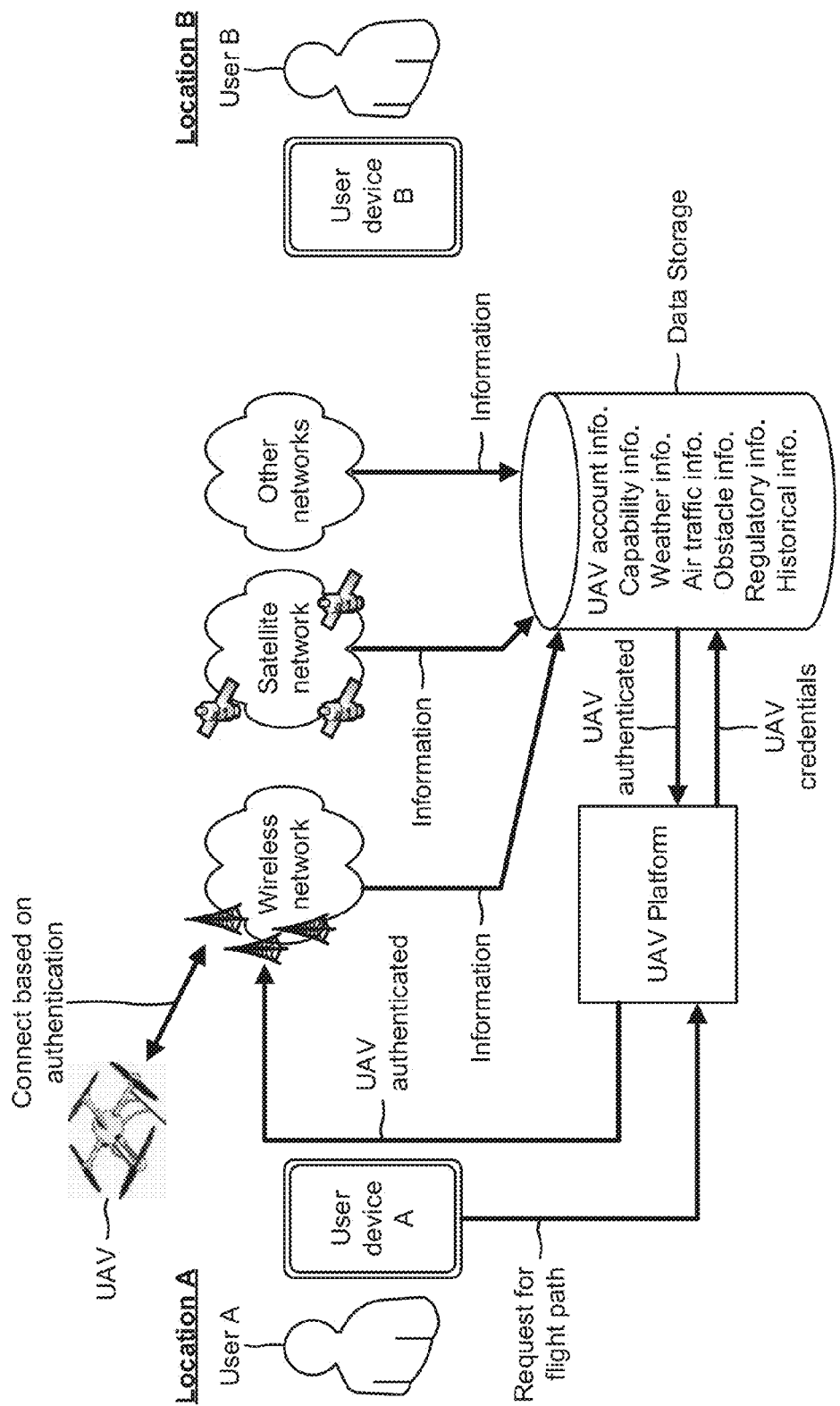
FIGS. 1A and 1B are diagrams of an overview of an example implementation described herein.
Figure 1B:
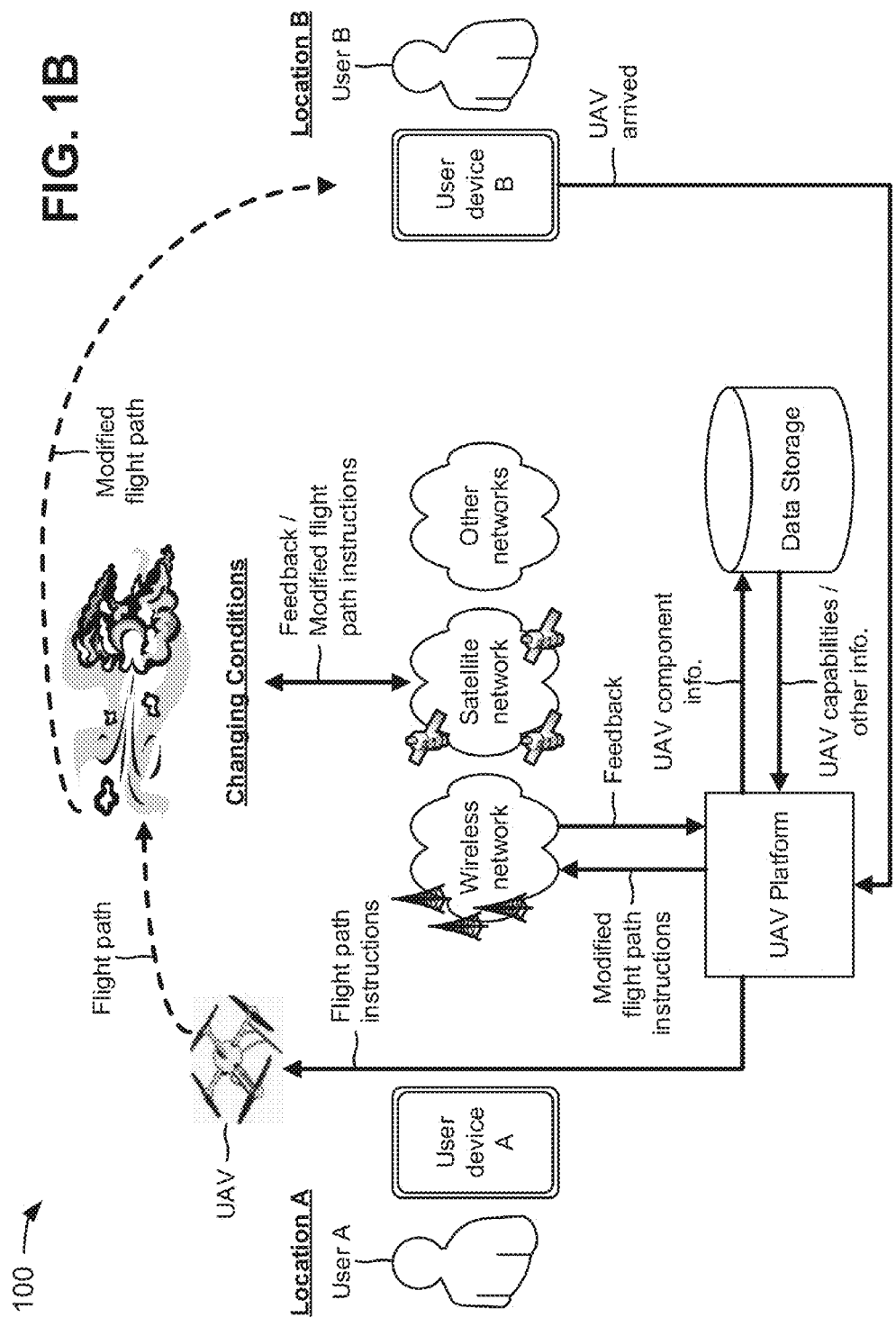

FIGS. 1A and 1B are diagrams of an overview of an example implementation 100 described herein. In example implementation 100, assume that a first user device (e.g., user device A) is associated with a first user (e.g., user A) that is located at an origination location (e.g., location A), as shown in FIG. 1A. Further, assume that user A wants to fly a UAV from location A to a destination location (e.g., location B) in order to deliver a package to a second user (e.g., user B) associated with a second user device (e.g., user device B). As further shown in FIG. 1A, a UAV platform or system may be associated with data storage, and the UAV platform and the data storage may communicate with a wireless network, a satellite network, and/or other networks. The wireless network, the satellite network, and/or the other networks may provide information to the data storage, such as capability information associated with UAVs (e.g., thrust, battery life, etc. associated with UAVs); weather information associated with a geographical region that includes geographical locations of location A, location B, and locations between location A and location B; air traffic information associated with the geographical region; obstacle information (e.g., buildings, mountains, etc.) associated with the geographical region; regulatory information (e.g., no fly zones, government buildings, etc.) associated with the geographical region; historical information (e.g., former flight paths, former weather, etc.) associated with the geographical region; etc.

As further shown in FIG. 1A, user A may instruct user device A (or the UAV) to generate a request for a flight path (e.g., from location A to location B) for the UAV, and to provide the request to the UAV platform. The request may include credentials (e.g., a serial number, an identifier of a universal integrated circuit card (UICC), etc.) associated with the UAV. The UAV platform may utilize the UAV credentials to determine whether the UAV is authenticated for utilizing the UAV platform and/or one or more of the networks, and is registered with an appropriate authority (e.g., a government agency) for use. For example, the UAV platform may compare the UAV credentials with UAV account information (e.g., information associated with authenticated and registered UAVs) provided in the data storage to determine whether the UAV is authenticated. As shown in FIG. 1A, assume that the UAV is authenticated, and that the UAV platform provides a message indicating that the UAV is authenticated to one or more of the networks (e.g., to the wireless network). The UAV may connect with the wireless network, the satellite network, and/or the other networks based on the authentication of the UAV.

As shown in FIG. 1B, the UAV platform may utilize information associated with the UAV (e.g., components of the UAV, the requested flight path, etc.) to identify capabilities of the UAV and other information in the data storage. For example, the UAV platform may retrieve capability information associated with the UAV and/or other information (e.g., the weather information, the obstacle information, the regulatory information, the historical information, etc. associated with the geographical region) from the data storage. The UAV platform may determine whether the UAV is capable of flight based on component information and/or maintenance information associated with the UAV. For example, the components of the UAV may be required to follow a maintenance schedule (e.g., for safety purposes), and may need to be certified (e.g., by a government agency) that the maintenance schedule is followed. If the maintenance schedule is not followed, the UAV platform may deny the request for the flight path. Assuming that the maintenance schedule is followed, the UAV platform may calculate the flight path from location A to location B based on the capability information and/or the other information, and may generate flight path instructions for the flight path. For example, the flight path instructions may indicate that the UAV is to fly at an altitude of two-thousand (2,000) meters, for fifty (50) kilometers and fifty-five (55) minutes, in order to arrive at location B.

The UAV platform may determine whether the UAV is capable of traversing the flight path based on the capability information associated with the UAV and/or the other information. If the UAV is not capable of traversing the flight path, the UAV platform may deny the request for the flight path. Assuming that the UAV is capable of traversing the flight path, the UAV platform may provide the flight path instructions to the UAV (e.g., via the wireless network), as further shown in FIG. 1B.

The UAV may take off from location A, and may travel the flight path based on the flight path instructions. While the UAV is traveling along the flight path, one or more of the networks may receive feedback from the UAV regarding the flight path (e.g., about changing conditions, such as speed, weather conditions, duration, etc.). Assume that the UAV senses changing weather conditions (e.g., a headwind on the UAV) along the flight path, and provides information about the weather conditions to the UAV platform (e.g., via the feedback). The UAV platform and/or the UAV may calculate a modified flight path that enables the UAV to avoid the headwind. The UAV platform and/or the UAV may generate modified flight path instructions for the modified flight path. The UAV platform may provide the modified flight path instructions to the UAV, and the UAV may travel the modified flight path, based on the modified flight path instructions, until the UAV arrives at location B. When the UAV arrives at location B, the UAV and/or user device B may generate a notification indicating that the UAV arrived safely at location B, and may provide the notification to the UAV platform.

Systems and/or methods described herein may provide a platform that enables UAVs to safely traverse flight paths from origination locations to destination locations. The systems and/or methods may perform a safety calculation for UAVs to ensure that only UAVs that are properly maintained and capable of traversing flight paths are provided flight path instructions. The systems and/or methods may also optimize use of UAVs to ensure that appropriately sized and capable UAVs are provided flight path instructions.

Figure 2:
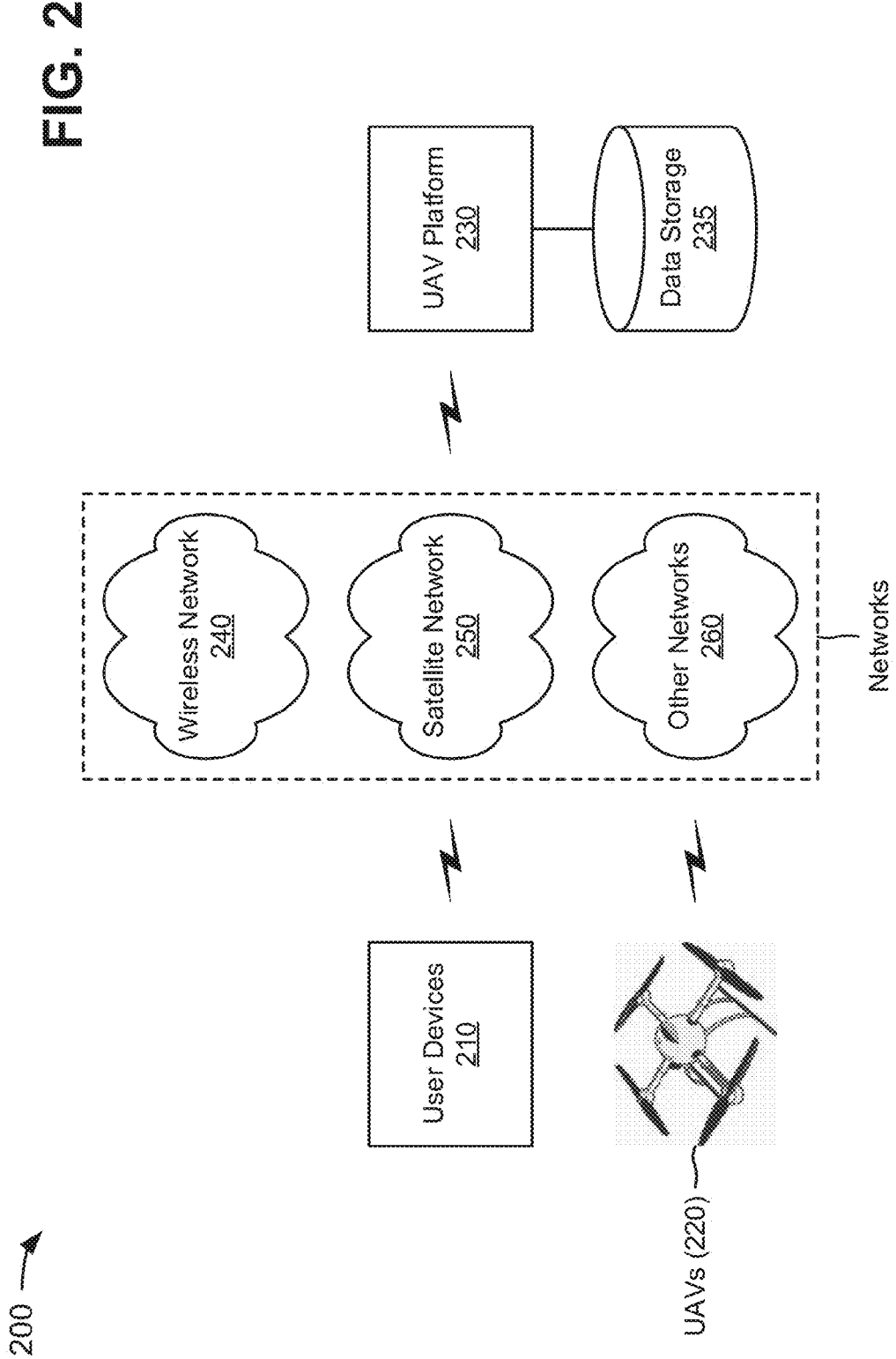
FIG. 2 is a diagram of an example environment in which systems and/or methods described herein may be implemented.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; generate one or more flight paths for UAV 220, etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

In some implementations, UAV 220 may be controlled by UAV platform 230 via communications with UAV platform 230. Additionally, or alternatively, UAV 220 may be controlled by the computational resources of UAV 220. Additionally, or alternatively, UAV 220 may be controlled by the computational resources of UAV 220. Additionally, or alternatively, UAV 220 may controlled by another UAV 220 via communications with the other UAV 220. Additionally, or alternatively, UAV 220 may be controlled by a combination of UAV platform 230, the computational resources of UAV 220, and/or the other UAV 220.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc. In some implementations, UAV platform 230 may receive, from UAV 220, a request for a flight path from an origination location to a destination location, and credentials associated with UAV 220. UAV platform 230 may authenticate UAV 220 for use of UAV platform 230 and/or networks 240-260 based on the credentials, and may determine whether UAV 220 is capable of flight based on component information and/or maintenance information associated with UAV 220. Assuming that UAV 220 is capable of flight, UAV platform 230 may determine whether UAV 220 is capable of traversing the flight path based on capability information associated with UAV 220 and/or other information (e.g., weather information, air traffic information, etc.). Assuming that UAV 220 is capable of traversing the flight path, UAV platform 230 may calculate the flight path from the origination location to the destination location based on the capability information and/or the other information, and may generate flight path instructions for the flight path. UAV platform 230 may provide the flight path instructions to UAV 220, and may receive feedback from UAV 220, via networks 240-260, during traversal of the flight path by UAV 220. UAV platform 230 may modify the flight path instructions based on the feedback, and may provide the modified flight path instructions to UAV 220. UAV platform 230 may receive a notification that UAV 220 arrived at the location when UAV 220 lands at the location.

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4B:
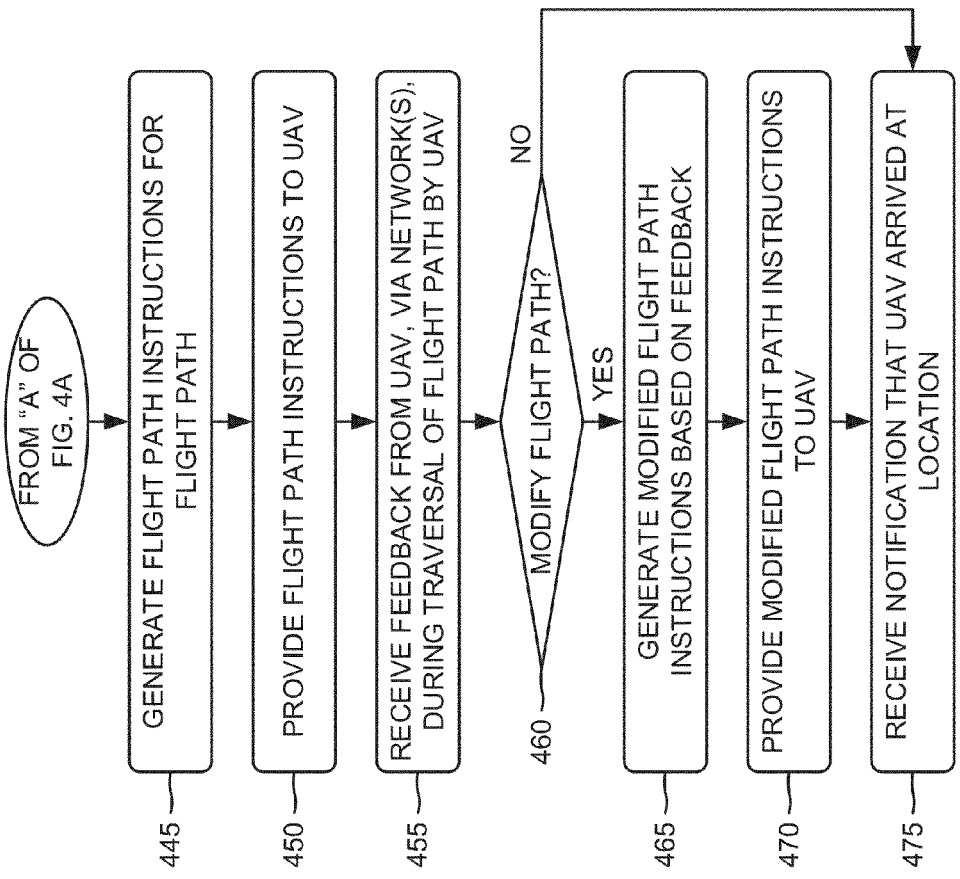

FIGS. 4A and 4B is a flow chart of an example process 400 for verifying an identity and capabilities of a UAV and for determining a flight path for the UAV. In some implementations, one or more process blocks of FIGS. 4A and 4B may be performed by UAV platform 230. In some implementations, one or more process blocks of FIGS. 4A and 4B may be performed by another device or a group of devices separate from or including UAV platform 230, such as user device 210 and/or UAV 220.

As shown in FIG. 4A, process 400 may include receiving, from a UAV, a request for a flight path to a location in a particular region, and credentials of the UAV (block 405). For example, UAV platform 230 may receive, from UAV 220, a request for a flight path to a location in the particular region, and credentials associated with UAV 220. In some implementations, user device 210 may provide information associated with the flight path to UAV 220, and UAV 220 may provide the request for the flight path to UAV platform 230. In some implementations, the request for the flight path may be provided by user device 210 to UAV platform 230. In some implementations, the request for the flight path may include a request for flight path instructions from an origination location (e.g., a current location of UAV 220) to a destination location (e.g., the location in the particular region). The origination location and the destination location may be provided in the particular region. In some implementations, the credentials of UAV 220 may include an identification number, a model number, a serial number, an identifier of a UICC (or another type of smart card), a government registration number, etc. associated with UAV 220. In some implementations, the credentials of UAV 220 may include information identifying components of UAV 220 (e.g., serial numbers, model numbers, part numbers, etc. of the components).

As further shown in FIG. 4A, process 400 may include determining whether the UAV is authenticated for network (s) and is registered with an appropriate authority based on the UAV credentials (block 410). For example, UAV platform 230 may determine whether UAV 220 is authenticated for using UAV platform 230 and/or one or more of networks 240-260 based on the credentials of UAV 220. In some implementations, UAV platform 230 may compare the credentials of UAV 220 with UAV account information stored in data storage 235 (e.g., information associated with authenticated and registered UAVs 220, such as identification numbers of UAVs 220, public and/or private keys of UAVs 220, account status information, etc.) in order to determine whether UAV 220 is authenticated for using UAV platform 230 and/or one or more of networks 240-260. For example, if the credentials of UAV 220 include a serial number of UAV 220, UAV platform 230 may compare the serial number to the UAV account information in data storage 235 to determine whether UAV 220 is registered with UAV platform 230, whether an account of UAV 220 is in good standing (e.g., paid for), etc. In some implementations, UAV platform 230 may determine whether UAV 220 is authenticated for using UAV platform 230 and/or one or more of networks 240-260 based on a UICC associated with UAV 220.

In some implementations, UAV platform 230 may determine whether UAV 220 is registered with an appropriate authority (e.g., a government agency) based on the credentials of UAV 220. For example, if the credentials of UAV 220 include a government registration number of UAV 220, UAV platform 230 may compare the government registration number to the UAV account information in data storage 235 to determine whether UAV 220 is registered with a government agency to legally fly in airspace regulated by the government agency. In some implementations, UAV 220 may include a common protocol with other UAVs 220. The common protocol may enable UAV 220 to be authenticated for using UAV platform 230 and/or one or more of networks 240-260, to communicate with the other UAVs 220, and/or to be verified as being registered with an appropriate authority. For example, if a particular UAV 220 is flying in an area where the particular UAV 220 loses communication with wireless network 240, UAV 220 may establish communications with other UAVs 220 located near the particular UAV 220 (e.g., via the common protocol). The other UAVs 220 may share information (e.g., received from wireless network 240) with the particular UAV 220 via the communications.

As further shown in FIG. 4A, if the UAV is not authenticated for the network(s) and/or is not registered with an appropriate authority (block 410—NO), process 400 may include denying the request for the flight path (block 415). For example, if UAV platform 230 determines that UAV 220 is not authenticated for using UAV platform 230 and/or one or more of networks 240-260 based on the credentials of UAV 220, UAV platform 230 may deny the request for the flight path. In some implementations, UAV platform 230 may provide, to UAV 220, a notification indicating that the request for the flight path is denied due to UAV 220 not being authenticated for using UAV platform 230 and/or one or more of networks 240-260. In some implementations, UAV platform 230 may determine that UAV 220 is not authenticated for using UAV platform 230 and/or one or more of networks 240-260 when UAV 220 is not registered with UAV platform 230, an account of UAV 220 is not in good standing, etc.

Alternatively, or additionally, if UAV platform 230 determines that UAV 220 is not registered with an appropriate authority based on the credentials of UAV 220, UAV platform 230 may deny the request for the flight path. In some implementations, UAV platform 230 may provide, to UAV 220, a notification indicating that the request for the flight path is denied due to UAV 220 not being registered with an appropriate authority. In some implementations, UAV platform 230 may determine that UAV 220 is not registered with an appropriate authority when UAV 220 fails to provide a government registration number via the credentials of UAV 220.

In some implementations, when UAV platform 230 denies the request for the flight path, UAV platform 230 may provide remediation procedures based on the denial of the request. For example, the notification, indicating that the request is denied, may include reason(s) for the denied request and one or more potential remediation options (e.g., the flight path requires a minimum battery level of 80%, please charge UAV 220; a rotor of UAV 220 requires certification of maintenance, please add maintenance code; etc.).

As further shown in FIG. 4A, if the UAV is authenticated for the network(s) and is registered with an appropriate authority (block 410—YES), process 400 may include receiving component information of the UAV (block 420). For example, if UAV platform 230 determines, based on the credentials of UAV 220, that UAV 220 is authenticated for using UAV platform 230 and/or one or more of networks 240-260, and is registered with an appropriate authority, UAV platform 230 may receive component information associated with UAV 220. In some implementations, UAV platform 230 may determine that UAV 220 is authenticated for using UAV platform 230 and/or one or more of networks 240-260 when UAV 220 is registered with UAV platform 230, an account of UAV 220 is in good standing, etc. In some implementations, UAV platform 230 may determine that UAV 220 is registered with an appropriate authority when UAV 220 provides a government registration number that matches a government registration number provided in data storage 235.

In some implementations, UAV platform 230 may request the component information from user device 210 and/or UAV 220, and user device 210 and/or UAV 220 may provide the component information to UAV platform 230 based on the request. In some implementations, user device 210 and/or UAV 220 may provide the component information to UAV platform 230 with the request for the flight path. In some implementations, UAV platform 230 may retrieve the component information from data storage 235 based on the credentials of UAV 220. The component information may include information describing components of UAV 220, such as identifiers (e.g., serial numbers, model numbers, etc.) of the components, information identifying a particular type of battery, engine, rotors, etc. of UAV 220, etc.

As further shown in FIG. 4A, process 400 may include determining whether the UAV is capable of flight based on the component information and maintenance information associated with the UAV (block 425). For example, UAV platform 230 may determine whether UAV 220 is capable of flight based on the component information and maintenance information associated with UAV 220. In some implementations, UAVs 220 may be required to follow a maintenance schedule (e.g., for safety purposes), and may need to be certified (e.g., by a government agency) that the maintenance schedule is followed. Such maintenance information may be provided in data storage 235, and UAV platform 230 may retrieve the maintenance information from data storage 235 (e.g., based on the component information).

In some implementations, UAV platform 230 may determine whether the components of UAV 220 are certified as following the maintenance schedule based on the maintenance information. For example, the maintenance information may indicate that a battery of UAV 220 is certified for four years, that rotors of UAV 220 are certified for two years, etc. In some implementations, if UAV platform 230 determines that the components of UAV 220 are certified as following the maintenance schedule, UAV platform 230 may determine that UAV 220 is capable of flight (e.g., permitted to fly). In some implementations, if UAV platform 230 determines that one or more components of UAV 220 are not certified as following the maintenance schedule, UAV platform 230 may determine that UAV 220 is not capable of flight (e.g., not permitted to fly).

As further shown in FIG. 4A, if the UAV is determined to not be capable of flight based on the component information and the maintenance information associated with the UAV (block 425—NO), process 400 may include denying the request for the flight path (block 415). For example, if UAV platform 230 determines that UAV 220 is not capable of flight based on the component information and the maintenance information associated with UAV 220, UAV platform 230 may deny the request for the flight path. In some implementations, UAV platform 230 may determine that UAV 220 is not capable of flight when one or more components of UAV 220 are not certified as following the maintenance schedule. In some implementations, UAV platform 230 may provide, to UAV 220, a notification indicating that the request for the flight path is denied due to one or more components of UAV 220 not being certified as following the maintenance schedule. This may enable UAV platform 230 to ensure that only properly maintained UAVs 220 are permitted to fly, which may increase safety associated with UAVs 220 utilizing airspace.

As further shown in FIG. 4A, if the UAV is determined to be capable of flight based on the component information and the maintenance information associated with the UAV (block 425—YES), process 400 may include receiving capability information for the UAV based on the component information of the UAV (block 430). For example, if UAV platform 230 determines that UAV 220 is capable of flight based on the component information and the maintenance information associated with UAV 220, UAV platform 230 may receive capability information for UAV 220 based on the component information of UAV 220.

In some implementations, UAV platform 230 may determine capability information for UAV 220 based on the request for the flight path and the component information of UAV 220 (e.g., provided with the request for the flight path). For example, data storage 235 may include capability information associated with different components of UAVs 220, such as battery life, thrusts provided by rotors, flight times associated with amounts of fuel, etc. In some implementations, UAV platform 230 may utilize the component information of UAV 220 (e.g., UAV 220 has a particular type of battery, engine, rotors, etc.) to retrieve the capability information for components of UAV 220 from data storage 235. For example, if UAV 220 has a particular type of battery and a particular type of rotor, UAV platform 230 may determine that the particular type of battery of UAV 220 may provide two hours of flight time and that the particular type of rotor may enable UAV 220 to reach an altitude of one-thousand meters.

As further shown in FIG. 4A, process 400 may include calculating the flight path to the location based on the capability information and the other information (block 435). For example, UAV platform 230 may calculate the flight path from the origination location to the destination location based on the capability information and/or the other information. In some implementations, UAV platform 230 may calculate the flight path from the origination location to the destination location based on the capability information associated with UAV 220 and/or the weather information, the air traffic information, the obstacle information, the regulatory information, and/or the historical information stored in UAV platform 230 and/or data storage 235. In some implementations, UAV platform 230 may determine whether the capability information indicates that UAV 220 may safely complete the flight path from the origination location to the destination location without stopping. If UAV platform 230 determines that UAV 220 cannot safely complete the flight path from the origination location to the destination location without stopping (e.g., to recharge or refuel), UAV platform 230 may determine one or more waypoints along the flight path where UAV 220 may stop and recharge or refuel.

In some implementations, UAV platform 230 may calculate the flight path based on the capability information associated with UAV 220 and the weather information. For example, UAV platform 230 may determine that, without weather issues, the flight path may take UAV 220 two hours to complete at an altitude of five-hundred meters. UAV platform 230 may further determine that wind conditions at five-hundred meters may create a headwind of fifty kilometers per hour on UAV 220, but that wind conditions at one-thousand meters may create a tailwind of fifty kilometers per hour on UAV 220. In such an example, UAV platform 230 may alter the flight path from an altitude of five-hundred meters to an altitude of one-thousand meters (e.g., if UAV 220 is capable of reaching the altitude of one-thousand meters). Assume that the tailwind at the altitude of one-thousand meters decreases the flight time from two hours to one hour and thirty minutes. Alternatively, UAV platform 230 may not alter the flight path, but the headwind at the altitude of five-hundred meters may increase the flight time from two hours to two hours and thirty minutes. UAV platform 230 may then determine whether UAV 220 is capable of flying the extra thirty minutes in the headwind (e.g., whether UAV 220 has adequate battery life or fuel).

Alternatively, or additionally, UAV platform 230 may calculate the flight path based on the capability information associated with UAV 220 and the air traffic information. For example, UAV platform 230 may determine that, without air traffic issues, the flight path may take UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may alter the flight path from an altitude of five-hundred meters to an altitude of one-thousand meters. The altitude of one-thousand meters may enable UAV 220 to safely arrive at the location without the possibility of colliding with other UAVs 220. Alternatively, UAV platform 230 may not alter the flight path, but the other UAVs 220 flying at the altitude of five-hundred meters may increase possibility that UAV 220 may collide with another UAV 220. UAV platform 230 may then determine whether UAV 220 is capable of safely flying at the altitude of five-hundred meters without colliding with another UAV 220.

Alternatively, or additionally, UAV platform 230 may calculate the flight path based on the capability information associated with UAV 220 and the obstacle information. For example, UAV platform 230 may determine that, without obstacle issues, the flight path may take UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may alter the flight path from an altitude of two-hundred meters to an altitude of three-hundred meters. The altitude of three-hundred meters may enable UAV 220 to safely arrive at the location without the possibility of colliding with the one or more buildings. Alternatively, UAV platform 230 may not alter the altitude of the flight path, but may change the flight path to avoid the one or more buildings, which may increase the flight time from one hour to one hour and thirty minutes. UAV platform 230 may then determine whether UAV 220 is capable of flying the extra thirty minutes.

Alternatively, or additionally, UAV platform 230 may calculate the flight path based on the capability information associated with UAV 220 and the regulatory information. For example, UAV platform 230 may determine that, without regulatory issues, the flight path may take UAV 220 one hour to complete at an altitude of five-hundred meters. UAV platform 230 may further determine that the flight path travels over a restricted facility based on the regulatory information. In such an example, UAV platform 230 may change the flight path to avoid flying over the restricted facility, which may increase the flight time from one hour to one hour and thirty minutes. UAV platform 230 may then determine whether UAV 220 is capable of flying the extra thirty minutes.

Alternatively, or additionally, UAV platform 230 may calculate the flight path based on the capability information associated with UAV 220 and the historical information. For example, UAV platform 230 may identify prior flight paths to the location from the historical information, and may select one of the prior flight paths, as the flight path, based on the capability information associated with UAV 220. In some implementations, UAV platform 230 may identify prior flight paths that include flight times of two hours, three hours, and four hours, and may determine that UAV 220 may safely fly for two hours and thirty minutes (e.g., based on the capability information). In such implementations, UAV platform 230 may select, as the flight path, the prior flight path with the flight time of two hours.

As further shown in FIG. 4A, process 400 may include determining whether the UAV is capable of traversing the flight path based on the capability information and/or other information (block 440). For example, UAV platform 230 may determine whether UAV 220 is capable of traversing the flight path based on the capability information associated with UAV 220 and/or other information (e.g., the weather information, the air traffic information, the obstacle information, the regulatory information, and/or the historical information) stored in UAV platform 230 and/or data storage 235. In some implementations, UAV platform 230 may determine that UAV 220 is capable of traversing the flight path when UAV 220 is capable of flying a distance associated with the flight path, in weather conditions (e.g., specified by the weather information), without colliding with air traffic and/or obstacles (e.g., specified by the air traffic information and the obstacle information), and without violating any regulations (e.g., specified by the regulatory information). In some implementations, UAV platform 230 may determine that UAV 220 is not capable of traversing the flight path when UAV 220 is not capable of flying a distance associated with the flight path, the weather conditions are too extreme for UAV 220 (e.g., specified by the weather information), UAV 220 may collide with air traffic and/or an obstacle (e.g., specified by the air traffic information and the obstacle information), or UAV 220 may violate any regulations (e.g., specified by the regulatory information).

As further shown in FIG. 4A, if the UAV is determined to not be capable of traversing the flight path based on the capability information and/or the other information (block 440—NO), process 400 may include denying the request for the flight path (block 415). For example, if UAV platform 230 determines that UAV 220 is not capable of traversing the flight path based on the capability information associated with UAV 220 and/or the other information, UAV platform 230 may deny the request for the flight path. In some implementations, UAV platform 230 may determine that UAV 220 is not capable of traversing the flight path when UAV 220 is not capable of flying a distance associated with the flight path, the weather conditions are too extreme for UAV 220, UAV 220 may collide with air traffic and/or an obstacle, or UAV 220 may violate any regulations. In some implementations, UAV platform 230 may provide, to UAV 220, a notification indicating that the request for the flight path is denied due to UAV 220 not being capable of traversing the flight path. This may enable UAV platform 230 to ensure that only capable UAVs 220 are permitted to fly, which may increase safety associated with UAVs 220 utilizing airspace.

As shown in FIGS. 4A and 4B, if the UAV is determined to be capable of traversing the flight path based on the capability information and/or the other information (block 440—YES), process 400 may include generating flight path instructions for the flight path (block 445). For example, if UAV platform 230 determines that UAV 220 is capable of traversing the flight path based on the capability information associated with UAV 220 and/or the other information, UAV platform 230 may generate flight path instructions for the flight path. In some implementations, UAV platform 230 may determine that UAV 220 is capable of traversing the flight path when UAV 220 is capable of flying a distance associated with the flight path, in the weather conditions, without colliding with air traffic and/or obstacles, and without violating any regulations. In some implementations, the flight path instructions may include specific altitudes for UAV 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240); timing information (e.g., when to take off, when to perform certain navigational maneuvers, etc.); waypoint information (e.g., locations where UAV 220 may stop and recharge or refuel); etc. For example, the flight path instructions may include information that instructs UAV 220 to fly forty-five degrees northeast for ten kilometers and at an altitude of five-hundred meters, then fly three-hundred and fifteen degrees northwest for ten kilometers and at an altitude of four-hundred meters, etc.

As further shown in FIG. 4B, process 400 may include providing the flight path instructions to the UAV (block 450). For example, UAV platform 230 may provide the flight path instructions to UAV 220. In some implementations, UAV 220 may utilize the flight path instructions to travel via the flight path. For example, UAV 220 may take off at a time specified by the flight path instructions, may travel a route and at altitudes specified by the flight path instructions, may detect and avoid any obstacles encountered in the flight path, etc. until UAV 220 arrives at the destination location.

In some implementations, if UAV 220 includes sufficient computational resources (e.g., a sufficient degree of autonomy), UAV 220 may utilize information provided by the flight path instructions to calculate a flight path for UAV 220 and to generate flight path instructions. In such implementations, the flight path instructions provided by UAV platform 230 may include less detailed information, and UAV 220 may determine more detailed flight path instructions via the computational resources of UAV 220.

As further shown in FIG. 4B, process 400 may include receiving feedback from the UAV, via network(s), during traversal of the flight path by the UAV (block 455). For example, while UAV 220 is traveling along the flight path in accordance with the flight path instructions, UAV 220 may provide feedback to UAV platform 230 via one or more of networks 240-260, and UAV platform 230 may receive the feedback. In some implementations, the feedback may include information received by sensors of UAV 220, such as visual information received from electromagnetic spectrum sensors of UAV 220 (e.g., images of obstacles), temperature information, wind conditions, etc. In some implementations, UAV 220 may utilize such feedback to detect and avoid any unexpected obstacles encountered by UAV 220 during traversal of the flight path. For example, if UAV 220 detects another UAV 220 in the flight path, UAV 220 may alter the flight path to avoid colliding with the other UAV 220.

As further shown in FIG. 4B, process 400 may include determining whether to modify the flight path based on the feedback from the UAV (block 460). For example, UAV platform 230 may determine whether to modify the flight path based on the feedback received from UAV 220. In some implementations, UAV platform 230 may determine to not modify the flight path if the feedback indicates that UAV 220 will safely arrive at the destination location. In some implementations, UAV platform 230 may determine to modify the flight path if the feedback indicates that UAV 220 is in danger of colliding with an obstacle (e.g., another UAV 220, a building, etc.). In such implementations, UAV platform 230 may modify the flight path so that UAV 220 avoids colliding with the obstacle and/or remains a safe distance from the obstacle. In some implementations, UAV platform 230 may determine to modify the flight path if the feedback indicates that the weather conditions may prevent UAV 220 from reaching the destination location. For example, the wind conditions may change and cause the flight time of UAV 220 to increase to a point where the battery of UAV 220 will be depleted before UAV 220 reaches the destination location. In such an example, UAV platform 230 may modify the flight path so that UAV 220 either stops to recharge or changes altitude to improve wind conditions. In another example, rain or ice may increase the weight of UAV 220 and/or its payload and may cause the battery of UAV 220 to work harder to a point where the battery of UAV 220 will be depleted before UAV 220 reaches the destination location. In such an example, UAV platform 230 may modify the flight path so that UAV 220 stops to recharge before completing the flight path.

As further shown in FIG. 4B, if the flight path is to be modified (block 460—YES), process 400 may include generating modified flight path instructions based on the feedback (block 465). For example, if UAV platform 230 determines that the flight path is be modified, UAV platform 230 may modify the flight path based on the feedback (e.g., as described above). In some implementations, UAV platform 230 may generate modified flight path instructions for the modified flight path based on the feedback. In some implementations, the modified flight path instructions may include the features of flight path instructions, but may be modified based on the feedback. For example, the flight path instructions may be modified so that UAV 220 avoids colliding with an obstacle and/or remains a safe distance from the obstacle, stops to recharge, changes altitude to improve wind conditions, etc.

As further shown in FIG. 4B, process 400 may include providing the modified flight path instructions to the UAV (block 470). For example, UAV platform 230 may provide the modified flight path instructions to UAV 220. In some implementations, UAV 220 may utilize the modified flight path instructions to travel along the modified flight path. For example, UAV 220 may adjust a route and altitudes according to the modified flight path instructions, may detect and avoid any obstacles encountered in the modified flight path, etc. until UAV 220 arrives at the destination location. In some implementations, UAV 220 may continue to provide further feedback to UAV platform 230 during traversal of the modified flight path, and UAV platform 230 may or may not further modify the flight path based on the further feedback.

As further shown in FIG. 4B, if the flight path is not to be modified (block 460—NO), process 400 may include receiving a notification that the UAV arrived at the location (block 475). For example, if the feedback indicates that UAV 220 will safely arrive at the destination location, UAV platform 230 may determine that the flight path need not be modified. In some implementations, UAV 220 may continue along the flight path based on the flight path instructions until UAV 220 arrives at the destination location. When UAV 220 arrives at the destination location, UAV 220 may provide a notification to UAV platform 230, via one or more of networks 240-260. In some implementations, the notification may indicate that UAV 220 has safely arrived at the destination location.

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
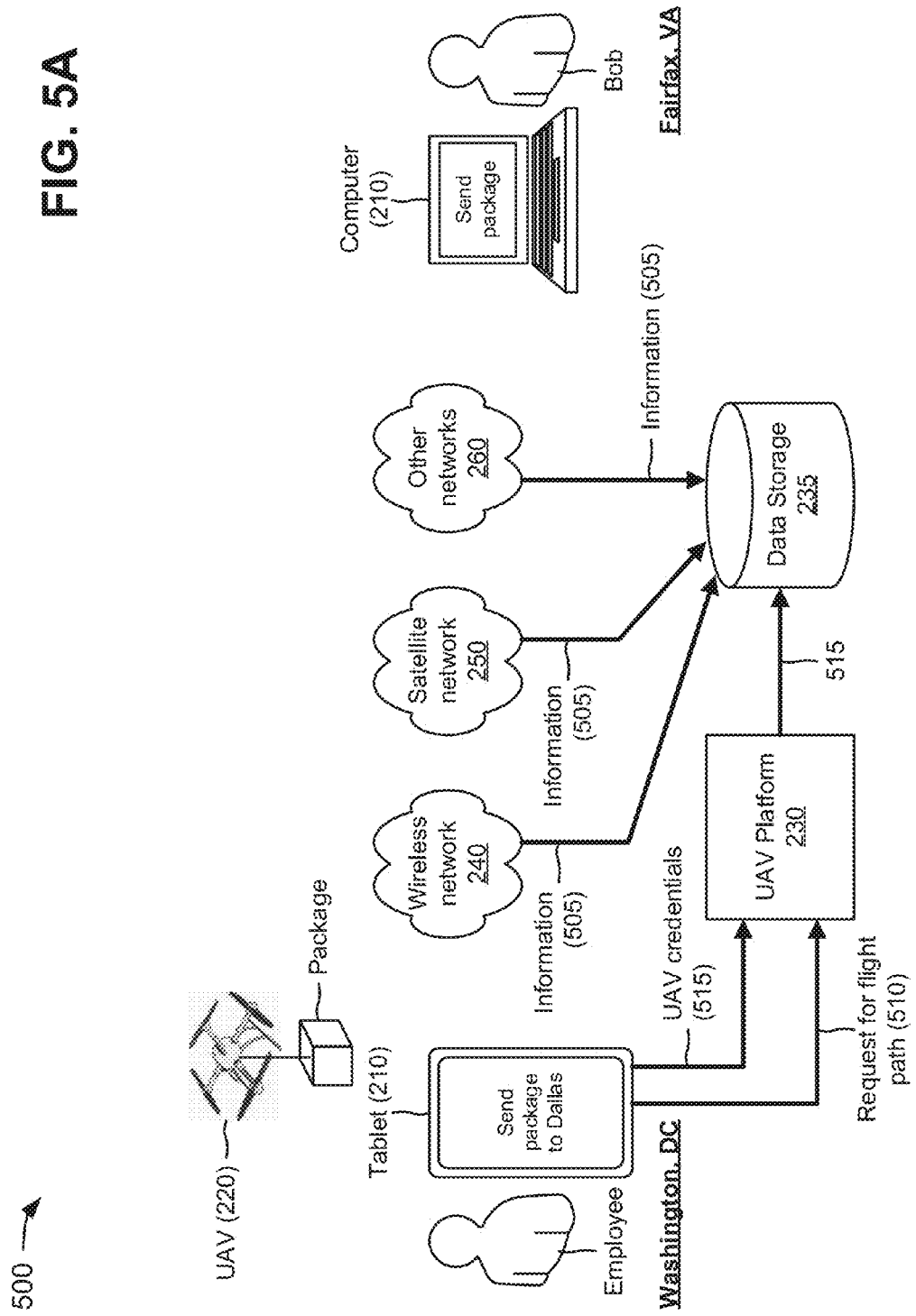

FIGS. 5A-5G are diagrams of an example 500 relating to example process 400 shown in FIGS. 4A and 4B. Assume that a first user device 210 (e.g., a tablet 210) is associated with a first user (e.g., an employee at a delivery company) that is located at an origination location (e.g., Washington, D.C.), as shown in FIG. 5A. Further, assume that a second user device 210 (e.g., a computer 210) is associated with a second user (e.g., Bob) that is located at a destination location (e.g., Fairfax, Va.), and that Bob has instructed computer 210 to request delivery of a package to Fairfax, Va. For example, computer 210 may inform tablet 210 (e.g., via one or more servers associated with the delivery company) and the employee that the package is to be delivered to Bob as soon as possible. Further, assume that the employee wants to utilize UAV 220 to fly the package from Washington, D.C. to a Fairfax, Va. in order to deliver the package to Bob. As further shown in FIG. 5A, UAV platform 230 and data storage 235 may communicate with wireless network 240, satellite network 250, and/or other networks 260. Wireless network 240, satellite network 250, and/or other networks 260 may provide, to data storage 235, information 505, such as capability information associated with UAV 220, weather information associated with a geographical region (e.g., that includes a geographical location of Washington, D.C., a geographical location of Fairfax, Va., and geographical locations between Washington and Fairfax), air traffic information associated with the geographical region, obstacle information associated with the geographical region, regulatory information associated with the geographical region, historical information associated with the geographical region, etc.

As further shown in FIG. 5A, the employee may instruct tablet 210 (or UAV 220) to generate a request 510 for a flight path (e.g., from Washington, D.C. to Fairfax, Va.) for UAV 220, and to provide request 510 to UAV platform 230. Request 510 may include credentials 515 (e.g., a serial number, an identifier of a UICC, etc. of UAV 220) associated with UAV 220, or credentials 515 may be provided separately from request 510 to UAV platform 230. UAV platform 230 may utilize credentials 515 to determine whether UAV 220 is authenticated for utilizing UAV platform 230 and/or one or more of networks 240-260, and is registered with an appropriate authority for use. For example, UAV platform 230 may compare credentials 515 with information provided in data storage 235 in order to determine whether UAV 220 is authenticated for utilizing UAV platform 230 and/or one or more of networks 240-260, and is registered with an appropriate authority.

Figure 5B:
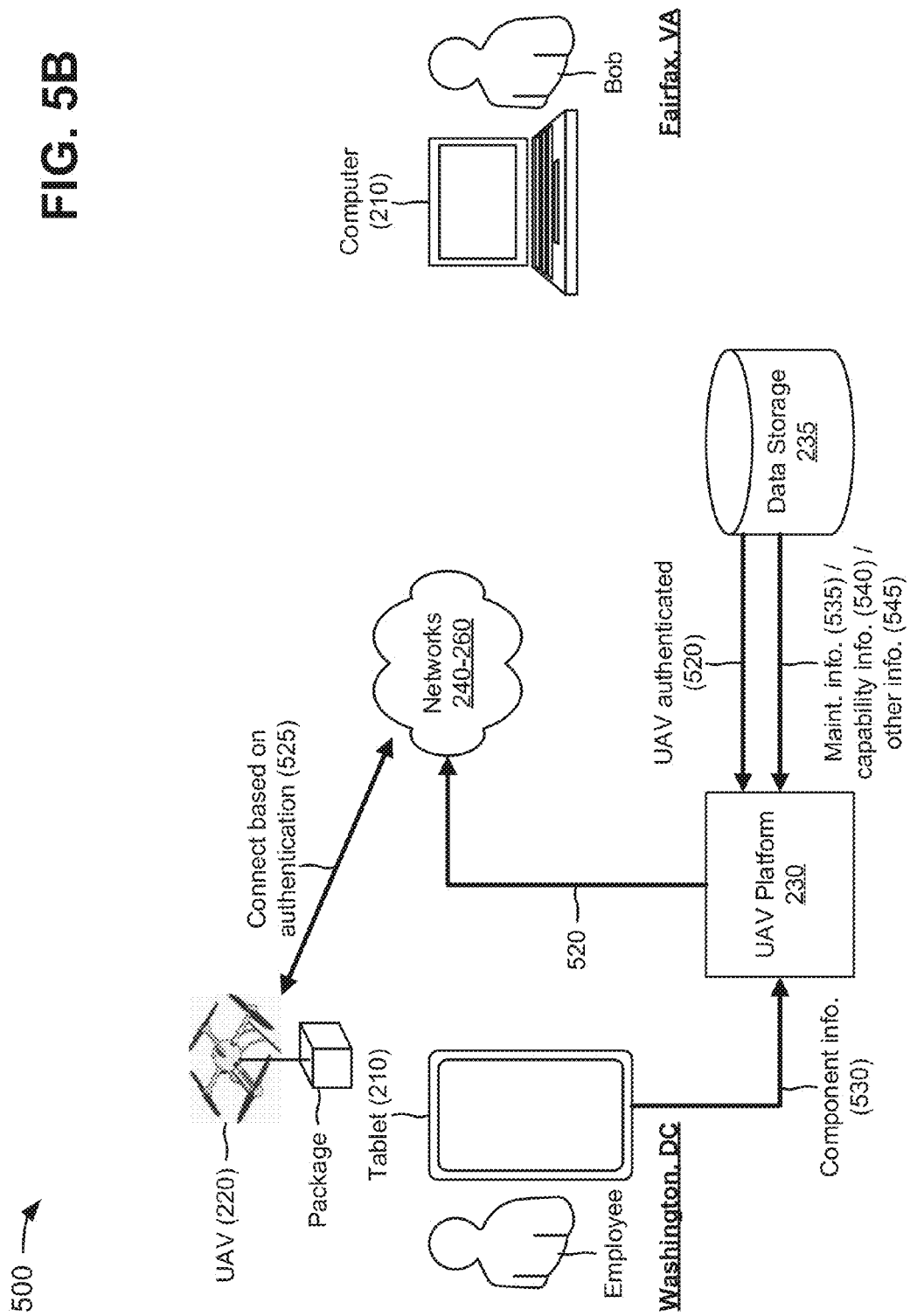

In some implementations, UAV platform 230 may compare credentials 515 with UAV account information, provided in data storage 235, to determine whether UAV 220 is authenticated for utilizing UAV platform 230 and/or one or more of networks 240-260, and is registered with an appropriate authority. As shown in FIG. 5B, assume that UAV 220 is authenticated, as indicated by reference number 520, and that UAV platform 230 provides, to networks 240-260, a message 520 indicating that UAV 220 is authenticated to use one or more of networks 240-260. UAV 220 may connect with one or more of networks 240-260 based on the authentication of UAV 220, as indicated by reference number 525. As further shown in FIG. 5B, UAV platform 230 may receive component information 530 associated with UAV 220, and may retrieve maintenance information 535 associated with UAV 220, capability information 540 associated with UAV 220, and other information 545 (e.g., weather information, air traffic information, obstacle information, regulatory information, and/or historical information) from data storage 235. In some implementations, UAV platform 230 may utilize component information 530 to identify maintenance information 535, capability information 540, and other information 545 in data storage 235.

Figure 5C:
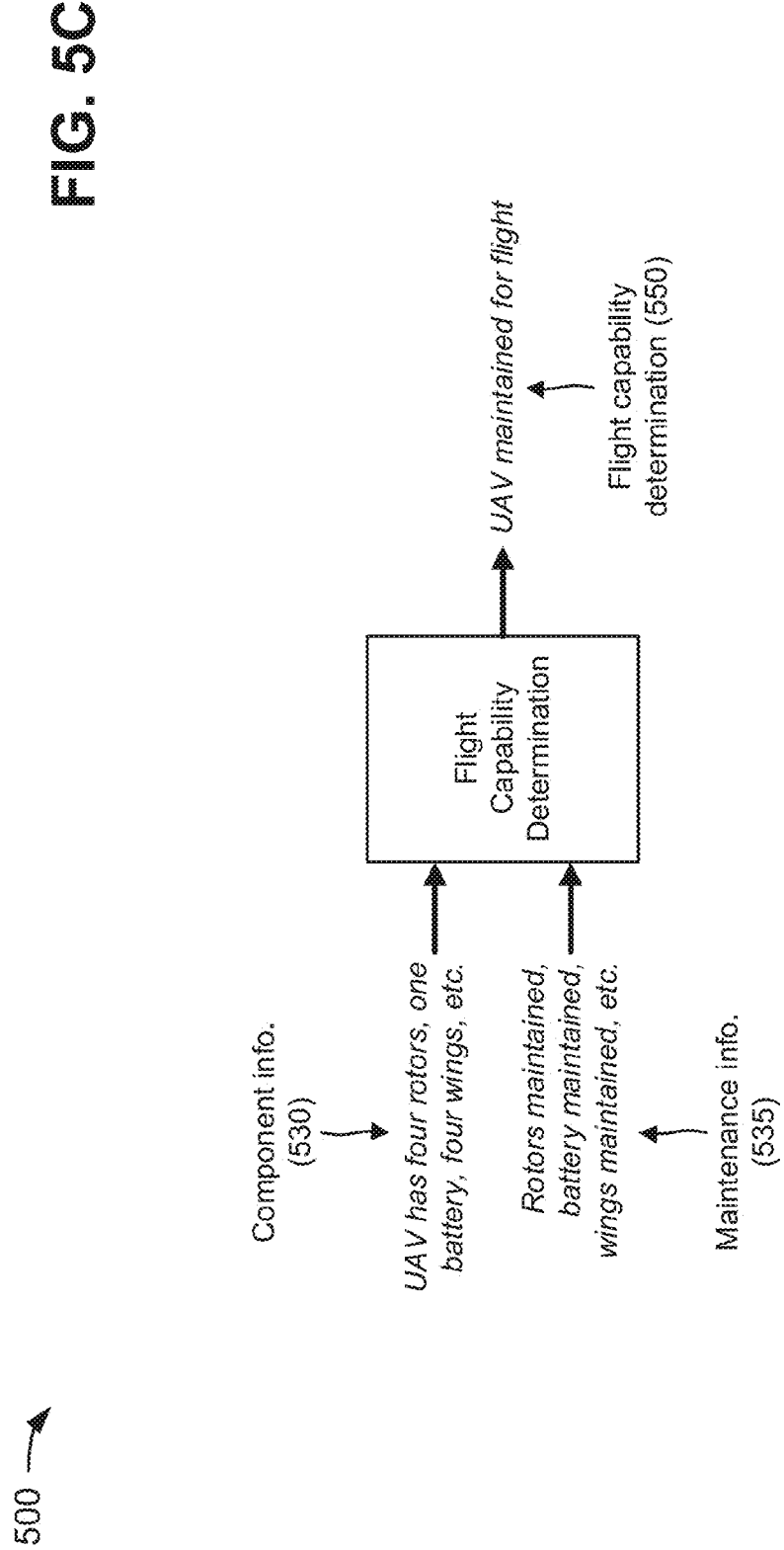

As shown in FIG. 5C, UAV platform 230 may determine whether UAV 220 is capable of flight based on component information 530 and maintenance information 535. For example, component information 530 may indicate that UAV 220 has four rotors, one battery, four wings, etc., and maintenance information 535 may indicate that the rotors, the battery, the wings, etc. of UAV 220 are maintained (e.g., certified as following a maintenance schedule by an appropriate authority). As further shown in FIG. 5C, UAV platform 230 may generate a flight capability determination 550 based on component information 530 and maintenance information 535. Assume that flight capability determination 550 indicates that UAV 220 is maintained for flight since maintenance information 535 indicates that the components of UAV 220 are certified as following the maintenance schedule.

Figure 5D:
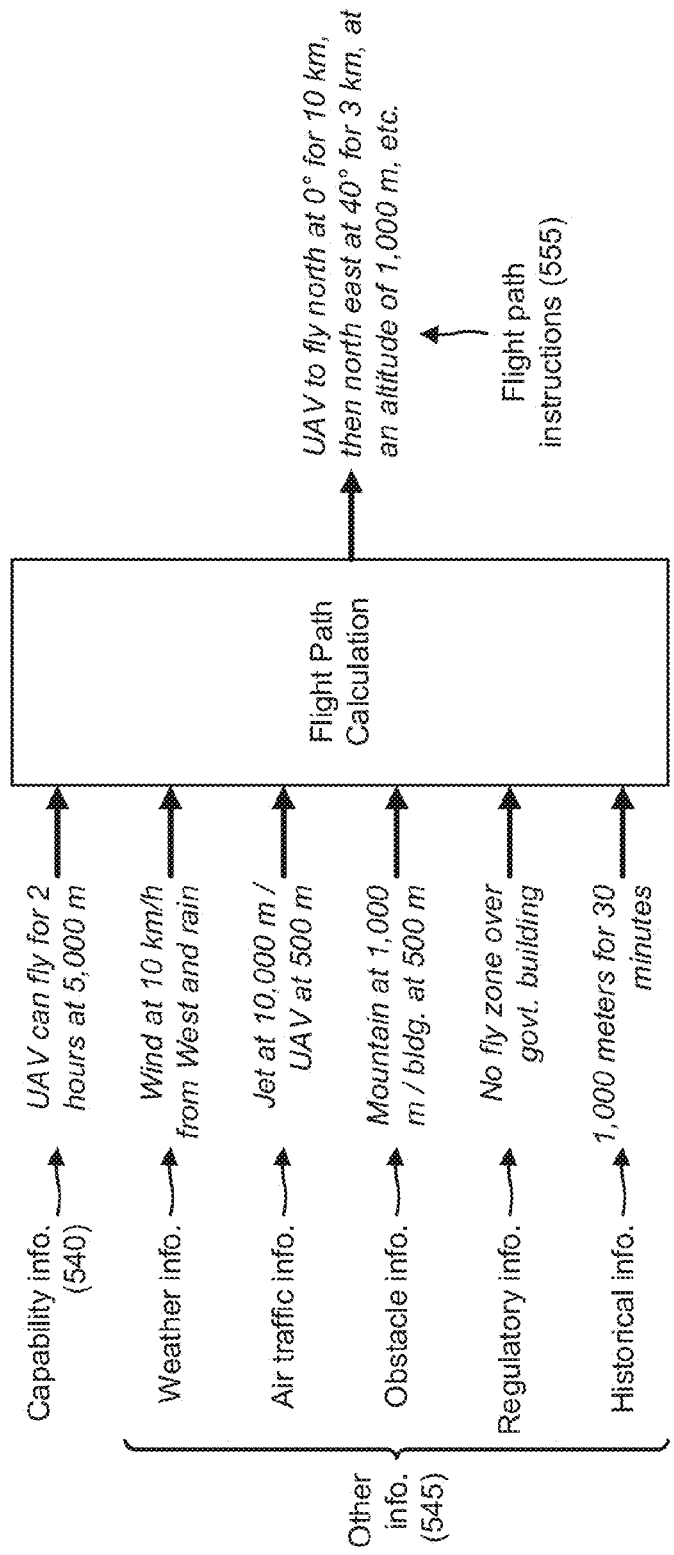

When flight capability determination 550 indicates that UAV 220 is maintained for flight, UAV platform 230 may calculate a flight path from Washington, D.C. to Fairfax, Va. based on capability information 540 and/or other information 545, and may generate flight path instructions 555 for the flight path, as shown in FIG. 5D. As further shown in FIG. 5D, flight path instructions 555 may include information instructing UAV 220 to fly north at zero degrees for ten kilometers, then northeast at forty degrees for three kilometers, at an altitude of one-thousand meters, etc.

Figure 5E:
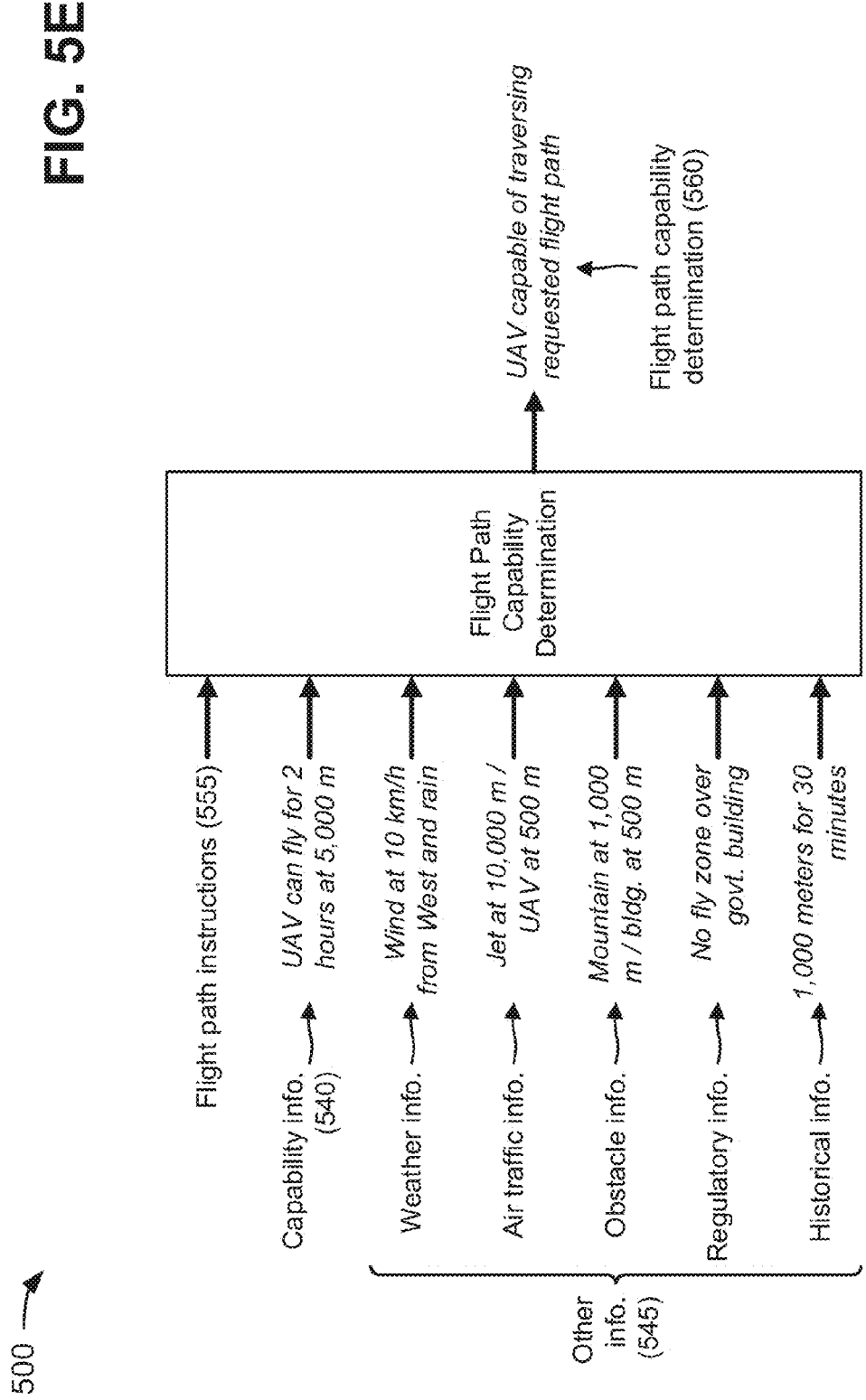

UAV platform 230 may determine whether UAV 220 is capable of traversing the flight path requested by request 510 based on capability information 540, other information 545, and/or flight path instructions, as shown in FIG. 5E. For example, capability information 540 may indicate that UAV 220 can fly for two hours at an altitude of five-thousand meters; the weather information may indicate that the wind is ten kilometers per hour from the west and that it is raining; the air traffic information may indicate that a jet is at an altitude of ten-thousand meters and another UAV 220 is at an altitude of five-hundred meters; the obstacle information may indicate that a mountain is one-thousand meters in height and a building is five-hundred meters in height; the regulatory information may indicate that there is a no fly zone over a government building; and the historical information may indicate that a historical flight path had a duration of thirty minutes and an altitude of one-thousand meters. As further shown in FIG. 5E, UAV platform 230 may generate a flight path capability determination 560 based on capability information 540 and other information 545. Assume that flight path capability determination 560 indicates that UAV 220 is capable of traversing the requested flight path.

As shown in FIG. 5F, if request 510 for the flight path is denied (e.g., due to UAV 220 being incapable of flight or traversal of the flight path), UAV platform 230 may provide, to tablet 210, a notification 565 indicating that the package cannot be sent to Fairfax, Va. via UAV 220. As further shown in FIG. 5F, if request 510 for the flight path is approved (e.g., due to UAV 220 being capable of flight and traversal of the flight path), UAV platform 230 may provide flight path instructions 555 to UAV 220 via one or more of networks 240-260. UAV 220 may take off from Washington, D.C., and may travel a flight path 570 based on flight path instructions 555.

While UAV 220 is traveling along flight path 570, one or more of networks 240-260 may receive feedback 575 from UAV 220 regarding traversal of flight path 570 by UAV 220 (e.g., changing conditions, such as speed, weather conditions, duration, etc.), as shown in FIG. 5G. Assume that UAV 220 senses bad weather (e.g., heavy rain) along flight path 570, and provides information about the bad weather to UAV platform 230 (e.g., via feedback 575). UAV platform 230 and/or UAV 220 may calculate a modified flight path that enables UAV 220 to avoid and/or remain a safe distance from the bad weather. UAV platform 230 and/or UAV 220 may generate modified flight path instructions 580 for a modified flight path 585. UAV platform 230 may provide modified flight path instructions 580 to UAV 220 (e.g., via one or more of networks 240-260), and UAV 220 may travel modified flight path 585, based on modified flight path instructions 580, until UAV 220 arrives at Fairfax, Va. When UAV 220 arrives at Fairfax, Va., UAV 220 and/or computer 210 (e.g., via Bob's input or GPS detection of the presence of UAV 220) may generate a notification 590 indicating that UAV 220 arrived safely at a particular GPS location in Fairfax, Va., and may provide notification 590 to UAV platform 230.

As indicated above, FIGS. 5A-5G are provided merely as an example. Other examples are possible and may differ from what was described with regard to FIGS. 5A-5G.

Systems and/or methods described herein may provide a platform that enables UAVs to safely traverse flight paths from origination locations to destination locations. The systems and/or methods may perform a strong safety calculation for UAVs to ensure that only UAVs that are properly maintained and capable of traversing flight paths are provided flight path instructions. The systems and/or methods may also optimize use of UAVs to ensure that appropriately sized and capable UAVs are provided flight path instructions.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, a request for a flight path for an unmanned aerial vehicle to travel from a first geographical location to a second geographical location in a region,
the request including credentials associated with the unmanned aerial vehicle and component information associated with components of the unmanned aerial vehicle;
determining, by the device and based on the credentials associated with the unmanned aerial vehicle, whether the unmanned aerial vehicle is authenticated for utilizing the device and a network associated with the device;
determining, by the device, whether the unmanned aerial vehicle is capable of flight based on the component information and maintenance information associated with the components of the unmanned aerial vehicle;
determining, by the device, capability information for the unmanned aerial vehicle based on the component information;
calculating, by the device and when the unmanned aerial vehicle is authenticated for utilizing the device and the network and is capable of flight,
the flight path from the first geographical location to the second geographical location based on the capability information and based on one or more of weather information, air traffic information, obstacle information, or regulatory information associated with the region;
determining, by the device, whether the unmanned aerial vehicle is capable of traversing the flight path based on the capability information and based on one or more of the weather information, the air traffic information, the obstacle information, or the regulatory information associated with the region;
generating, by the device and when the unmanned aerial vehicle is capable of traversing the flight path, flight path instructions for the flight path; and
providing, by the device, the flight path instructions to the unmanned aerial vehicle to permit the unmanned aerial vehicle to travel from the first geographical location to the second geographical location via the flight path.

2. The method of claim 1, further comprising:
denying the request for the flight path when at least one of:
the unmanned aerial vehicle is not authenticated for utilizing the device or the network,
the unmanned aerial vehicle is incapable of flight, or
the unmanned aerial vehicle is incapable of traversing the flight path; and
providing, based on denying the request for the flight path, a message indicating that the request for the flight path is denied.

3. The method of claim 1, further comprising:
determining, based on the credentials associated with the unmanned aerial vehicle, whether the unmanned aerial vehicle is registered with an appropriate authority;
denying the request for the flight path when the unmanned aerial vehicle is not authenticated for utilizing the device and the network or when the unmanned aerial vehicle is not registered with the appropriate authority; and
providing, based on denying the request for the flight path, a message indicating that the request for the flight path is denied.

4. The method of claim 1, further comprising:
receiving, via the network, feedback from the unmanned aerial vehicle during traversal of the flight path by the unmanned aerial vehicle; and
determining whether to modify the flight path based on the feedback received from the unmanned aerial vehicle.

5. The method of claim 4, further comprising:
calculating, when the flight path is to be modified, a modified flight path to the second geographical location based on the feedback;
generating modified flight path instructions for the modified flight path; and
providing the modified flight path instructions to the unmanned aerial vehicle.

6. The method of claim 1, further comprising:
receiving a notification indicating that the unmanned aerial vehicle arrived at the second geographical location when the unmanned aerial vehicle arrives at the second geographical location.

7. The method of claim 1, where the method further comprises:
receiving the component information, the maintenance information, and the capability information; and
storing the component information, the maintenance information, and the capability information.

8. A system, comprising:
a storage device to store one or more of:
weather information associated with a region,
air traffic information associated with the region,
obstacle information associated with the region, or
regulatory information associated with the region; and
one or more devices to:
receive a request for a flight path for an unmanned aerial vehicle to travel from a first geographical location to a second geographical location in the region,
the request including credentials associated with the unmanned aerial vehicle;
determine, based on the credentials associated with the unmanned aerial vehicle, whether the unmanned aerial vehicle is authenticated for utilizing the one or more devices and a network associated with the one or more devices;

determine whether the unmanned aerial vehicle is capable of flight based on component information associated with components of the unmanned aerial vehicle and maintenance information associated with the components of the unmanned aerial vehicle;

determine capability information for the unmanned aerial vehicle based on the component information;

calculate, when the unmanned aerial vehicle is authenticated for utilizing the one or more devices and the network and is capable of flight, the flight path from the first geographical location to the second geographical location based on the capability information and based on one or more of the weather information, the air traffic information, the obstacle information, or the regulatory information associated with the region;

determine whether the unmanned aerial vehicle is capable of traversing the flight path based on the capability information and based on one or more of the weather information, the air traffic information, the obstacle information, or the regulatory information associated with the region;

generate, when the unmanned aerial vehicle is capable of traversing the flight path, flight path instructions for the flight path; and provide the flight path instructions to the unmanned aerial vehicle to permit the unmanned aerial vehicle to travel from the first geographical location to the second geographical location via the flight path.

9. The system of claim 8, where the one or more devices are further to:
deny the request for the flight path when at least one of:
the unmanned aerial vehicle is not authenticated for utilizing the one or more devices or the network,
the unmanned aerial vehicle is incapable of flight, or
the unmanned aerial vehicle is incapable of traversing the flight path; and
provide, based on denying the request for the flight path, a message indicating that the request for the flight path is denied.

10. The system of claim 8, where the one or more devices are further to:
determine, based on the credentials associated with the unmanned aerial vehicle, whether the unmanned aerial vehicle is registered with an appropriate authority;
deny the request for the flight path when the unmanned aerial vehicle is not authenticated for utilizing the one or more devices or the network or when the unmanned aerial vehicle is not registered with the appropriate authority; and
provide, based on denying the request for the flight path, a message indicating that the request for the flight path is denied.

11. The system of claim 8, where the one or more devices are further to:
receive, via the network, feedback during traversal of the flight path by the unmanned aerial vehicle; and
determine whether to modify the flight path based on the feedback received from the unmanned aerial vehicle.

12. The system of claim 11, where the one or more devices are further to:
calculate, when the flight path is to be modified, a modified flight path to the second geographical location based on the feedback;
generate modified flight path instructions for the modified flight path; and
provide the modified flight path instructions to the unmanned aerial vehicle.

13. The system of claim 8, where the one or more devices are further to:
receive a notification indicating that the unmanned aerial vehicle arrived at the second geographical location.

14. The system of claim 13, where the notification is generated by the unmanned aerial vehicle.

15. A non-transitory computer-readable medium for storing instructions, the instructions comprising:
one or more instructions that, when executed by one or more processors of a device, cause the one or more processors to:
receive a request for
a flight path for an unmanned aerial vehicle from a first geographical location to a second geographical location in a region,
credentials associated with the unmanned aerial vehicle, and
component information associated with components of the unmanned aerial vehicle;
determine, based on the credentials associated with the unmanned aerial vehicle, whether the unmanned aerial vehicle is authenticated for utilizing the device and a network associated with the device;
determine, when the unmanned aerial vehicle is authenticated for utilizing the device and the network, whether the unmanned aerial vehicle is capable of flight based on the component information and maintenance information associated with the components of the unmanned aerial vehicle;
determine capability information for the unmanned aerial vehicle based on the component information;
calculate, when the unmanned aerial vehicle is capable of flight, the flight path from the first geographical location to the second geographical location based on the capability information and based on one or more of weather information, air traffic information, obstacle information, or regulatory information associated with the region;
determine whether the unmanned aerial vehicle is capable of traversing the flight path based on the capability information and based on one or more of the weather information, the air traffic information, the obstacle information, or the regulatory information associated with the region;
generate, when the unmanned aerial vehicle is capable of traversing the flight path, flight path instructions for the flight path; and
provide the flight path instructions to the unmanned aerial vehicle to permit the unmanned aerial vehicle to travel from the first geographical location to the second geographical location via the flight path.

16. The non-transitory computer-readable medium of claim 15, where the instructions further comprise:
one or more instructions that, when executed by the one or more processors, cause the one or more processors to:
deny the request for the flight path when at least one of:
the unmanned aerial vehicle is not authenticated for utilizing the device or the network,
the unmanned aerial vehicle is incapable of flight, or
the unmanned aerial vehicle is incapable of traversing the flight path; and
provide, based on denying the request for the flight path, a message indicating that the request for the flight path is denied.

17. The non-transitory computer-readable medium of claim 15, where the instructions further comprise:
one or more instructions that, when executed by the one or more processors, cause the one or more processors to:
determine, based on the credentials associated with the unmanned aerial vehicle, whether the unmanned aerial vehicle is registered with an appropriate authority;
deny the request for the flight path when the unmanned aerial vehicle is not authenticated for utilizing the device or the network or when the unmanned aerial vehicle is not registered with the appropriate authority; and
provide, based on denying the request for the flight path, a message indicating that the request for the flight path is denied.

18. The non-transitory computer-readable medium of claim 15, where the instructions further comprise:
one or more instructions that, when executed by the one or more processors, cause the one or more processors to:
receive, via the network, feedback during traversal of the flight path by the unmanned aerial vehicle; and
determine whether to modify the flight path based on the feedback received from the unmanned aerial vehicle.

19. The non-transitory computer-readable medium of claim 18, where the instructions further comprise:
one or more instructions that, when executed by the one or more processors, cause the one or more processors to:
calculate, when the flight path is to be modified, a modified flight path to the second geographical location based on the feedback;
generate modified flight path instructions for the modified flight path; and
provide the modified flight path instructions to the unmanned aerial vehicle.

20. The non-transitory computer-readable medium of claim 15, where the instructions further comprise:
one or more instructions that, when executed by the one or more processors, cause the one or more processors to:
receive a notification indicating that the unmanned aerial vehicle arrived at the second geographical location.

\* \* \* \* \*